July 12, 1949.　　　　N. W. LEWIS　　　　2,476,245
VARIABLE TRANSMISSION
Filed July 27, 1944　　　　　　　　　　2 Sheets-Sheet 1
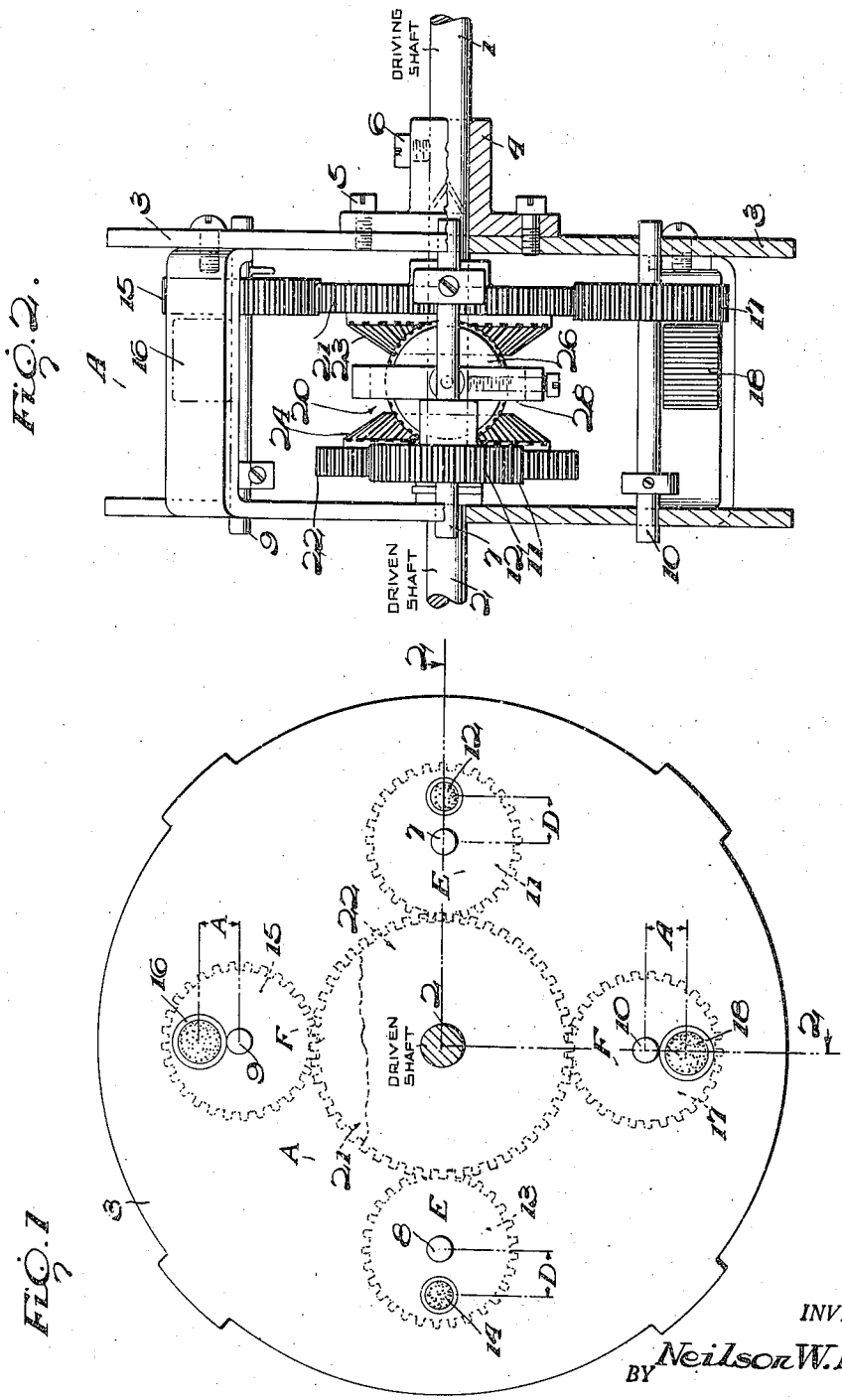
INVENTOR.
BY Neilson W. Lewis
Raymond J. Norton
ATTORNEY July 12, 1949.  N. W. LEWIS  2,476,245
VARIABLE TRANSMISSION
Filed July 27, 1944  2 Sheets-Sheet 2
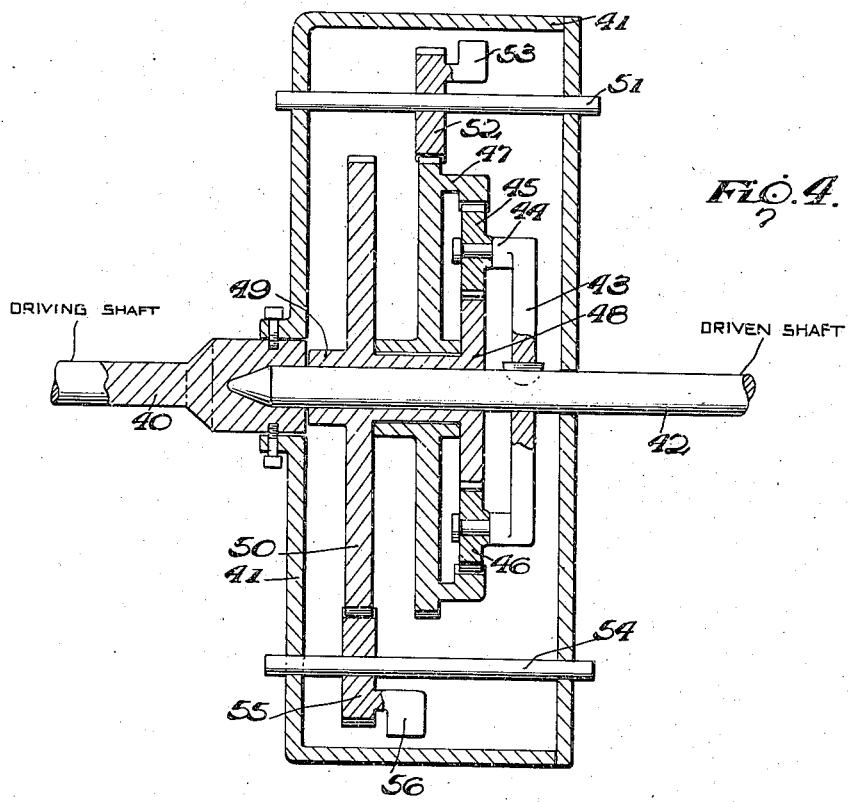
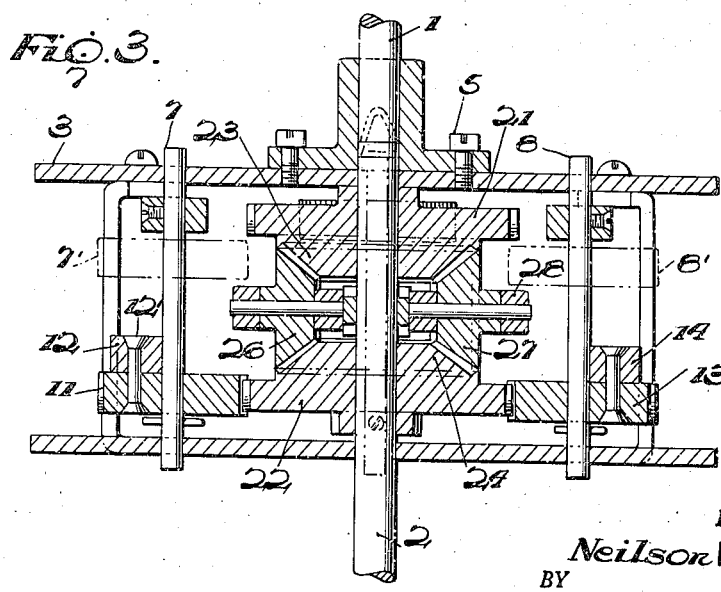
INVENTOR.
Neilson W. Lewis.
BY
Raymond J. Norton
ATTORNEY

Patented July 12, 1949

2,476,245

UNITED STATES PATENT OFFICE 2,476,245

VARIABLE TRANSMISSION

Neilson Wilde Lewis, Washington, D. C.

Application July 27, 1944, Serial No. 546,793

8 Claims. (Cl. 74—752)

This invention relates to a power transmission system, and more particularly to a variable automatic transmission.

In certain power transmission systems, as for example in automotive transmissions, it is highly desirable to provide a system which insures smooth and continuous variations in ratios between the drive and driven shafts and to establish a wide permissive range of drive to driven ratios. In the past, suggestions of this type have been made but these fall short of the completely desirable structure.

The present invention relates to an automatically variable transmission which is characterized by a simplicity of structure and eminent smoothness of operation. This type of structure presents definite advantages over the step-by-step type of transmission because of its automatic character and its instant response to the resistance of the load. As will be seen herein after, the type of transmission contemplated herein is of the infinitely variable type, thus establishing the possibility of greater reduction ratios than in the ordinary gear shift transmission, thereby insuring an increase in motor speed to establish a definite economy in gasoline consumption.

The present invention comprehends broadly the provision of an automatic variable transmission which involves the utilization of specially designed and correlated eccentric weights. The design of the unit is such that slippage under acceleration is avoided with consequent increase in over-all efficiency.

Considered generally, the improved mechanism utilizes two sets of eccentric weights mounted on either side of a differential gear. In order to enable a more ready comprehension of the invention, a preferred physical embodiment is shown in the accompanying drawing in which:

Fig. 1 is a diagrammatic end elevation of a transmission unit,

Fig. 2 is a vertical section taken on line 2—2 of Fig. 1,

Fig. 3 is a horizontal cross-section taken on line 2—2 of Fig. 1, and

Fig. 4 is a vertical cross-section of a modified type of structure.

The present invention, as noted hereinbefore, contemplates the provision of a variable automatic speed transmission in which two sets of eccentric weights of different mass are mounted in a planetary gear system and on either side of a differential gear such that the combination insures a smooth and infinitely variable ratio between the driving and driven shafts and without the use of a conventional one-way clutch and spring mechanisms.

The essential function of this novel combination, as will be seen more fully hereinafter, is to be carefully distinguished from certain prior structures which involve the utilization of eccentric weights. Generally considered such structures comprise a system in which the torque from the driving shaft is transmitted through a planetating gear to a gear attached to the driven shaft. In such structures the planetating gear is provided with an eccentrically mounted weight. In operation of this type of structure the resistance of the driven shaft, set up for example, by an increase in load, interacts on the planet gear and effects its rotation such that the weight tends to move toward the central axis of rotation. This movement is resisted by the centrifugal force caused by the rotation of the weight about the central axis of rotation. The resultant component of force thus causes a torque to be imposed by the planet gear on the gear of the driven shaft tending to effect its rotation in the same direction as the driving shaft. However, in such mechanisms when the eccentric weight has rotated past its innermost position it then begins to impose a torque on the driven shaft which is in the opposite direction. In other words, the torque ultimately delivered as the result of the action of the eccentric weight varies cyclically in intensity and direction. In prior constructions in order to secure the desired unidirectional or rectified torque it was necessary to utilize a one-way clutch or similar mechanism. In certain of such structures it was found desirable to employ a torsion spring together with the clutch to smooth out the operation. These structures inherently fail to deliver a perfectly smooth torque and present the difficulty of current failures of the spring and clutch under fatigue stresses.

The construction and advantages of the invention will be more readily appreciated from a consideration of the structure shown in the accompanying drawings.

The novel variable automatic transmission unit designated generally by the numeral "A" is interposed between the driving shaft 1 and the driven shaft 2. It will be appreciated that the driving shaft is connected to any suitable power plant, such as an internal combustion motor, electric motor, steam plant, and the like. The driven shaft is connected to any unit or units to which driving torque is to be ultimately transmitted.

In a typical embodiment of the invention, as shown in the drawings, the transmission mechanism includes the case 3 of a planetary gear system, which case is connected in any suitable manner to the drive shaft 1. As shown, this may be effected by attaching the case 3 to the flange or collar 4, which is locked or attached to both the case and the driving shaft. This attachment may be effected in any suitable manner, as for example, by use of the cap screws 5 and set screws 6, as shown.

The case 3 carries the pairs of diametrically positioned shafts 7 and 8, and 9 and 10, respectively. As shown in Fig. 3, the shaft 7 has keyed or otherwise secured thereto the gear 11 which carries the eccentrically positioned weight 12 which may be attached to the gear in any suitable manner, as for example, by the rivet, or equivalent, 12'. Similarly, the shaft 8 has mounted thereon the gear 13 which carries the eccentrically positioned weight 14. The weights 12 and 14 are equal and are each mounted at a predetermined equal distance from the axis of their respective gears. The shafts 7 and 8 are mounted for free rotation in the planetary case 3.

Shafts 9 and 10, as shown in Fig. 2, are similarly provided with planetary gears, having associated eccentric weights. The shaft 9 has suitably affixed thereto the gear 15 to which is attached the eccentric weight 16. Similarly, shaft 10 has mounted thereon and keyed thereto the gear 17 to which is affixed the weight 18. Weights 16 and 18 are of equal magnitude and are positioned the same distance from the axis of rotation of their respective gears.

It is particularly to be observed that the eccentric weights 12 and 14, on the one hand, and 16 and 18 on the other, are of different magnitudes. These weights and their distances from the axis of rotation of their corresponding gears are so correlated as to produce impulses or reactive forces of varying intensities and direction which are impressed on the centrally mounted differential gear unit and in this unit are combined into a single resultant smooth, positive impulse which exactly equals the resistance of the driven shaft. As is known, the speed of the driven shaft will vary inversely as the torque impressed upon it. As shown in Fig. 1, the eccentricity of weights 12 and 14 is designated as "D," and the eccentricity of the balanced weights 16 and 17 is designated as "A." As the result of considerable experimentation and testing, it has been determined that the ratio of movement of the weights about the axis of the gears is such that $$\frac{\text{Wt. 16.A}}{\text{Wt. 12.D}}$$

should be about 3.25. It has been found that if balance wheels 7' and 8' are mounted on the shafts 7 and 8 so as to make the moments of inertia of gears 11 and 13 equal the moments of inertia of gears 15 and 17 this relationship may be changed. When such compensating balance wheels are employed the above defined ratio should be about 2.5.

As indicated previously, the described novel planetary gear train is adapted to react with the central differential gear designated generally by the numeral 20. The differential gear is mounted on the central axis of the transmission, and, as shown, includes the idling gear 21, which meshes with the planetary gears 15 and 17, and the corresponding idling gear 22, which meshes with the planetary gears 11 and 13. The idling gears 21 and 22 carry the crown gears 23 and 24, which mesh with the bevel gears or pinions 26 and 27 mounted on the central arm or spider 28 of the differential gear. As shown, the central arm 28 is fixed to the driven shaft 2 and transmits resultant torque to this shaft.

The essential operation of such a structure will have been appreciated from the foregoing description. In operation as the shaft 1 and the connected case 3 of the planetary system is driven, centrifugal force drives the heavier pair of weights 16 and 18 to their outermost positions (as shown in Fig. 1) and the gears 11 and 13 make complete revolutions. This, in turn, causes gears 15 and 17 to oscillate through an angle of about 90°, with the outermost point of the weights as a mid position. In these circumstances a steady torque, in an amount required by the load, is delivered to the driven shaft 2 and at a speed corresponding to that of the driving shaft 1. This mechanism is so designed and constructed that there is an inherent tendency for the larger weights to oscillate and the smaller weights to make complete rotations. This tendency is effected by two factors as will have been appreciated. When the driving side rotates against the opposition of the resistance which causes the central spider 20 to tend to remain stationary, planetary gears 15, 17 and 11, 13, mounting eccentric weights 12, 14, 16, 18 tend to revolve about their own axes. Inasmuch as weights 16 and 18 are heavier than weights 12 and 14, the centrifugal force due to the motion of the case 3 causes 16 and 18 to oppose such rotation with greater force than weights 12 and 14. Now, as planetary gears 15 and 17 are mechanically connected through the gear train 22, 24, 27, 26, 23 and 21 with the planetary gears 11 and 13, and as the two sides of the differential balance each other they both act to overcome the resistance of the central spider the lighter weights 11, 13 move farther in their rotational path than the heavier weights 15, 17. The ratio of the light weights to the heavy ones is made such that the lighter weights reach an innermost position before the heavier ones have made a quarter revolution.

The entire inner movable train is so constructed that a force causing rotation of the planetary gears connected with one section of the differential causes the planetary gears connected with the other section of the differential to rotate in an opposite direction. Thus, when the light weights tend to move outward after passing their innermost position they cause the heavy weights to return towards their outermost position, that is to say, to oscillate back to the original outermost position.

The unit thus is eminently simple and involves the concept of driving sequentially through a planetary gear train, having weighted gear pairs of respectively different eccentricities, and thence through a differential gearing to the driven shaft.

In this type of construction, as will be appreciated, numerous advantages accrue. In this system all of the gears employed are in constant mesh at all times and the operation is thus smooth and automatic. It will have been appreciated that the interaction of the eccentrics insures a novel and effective operation. It will be seen that the eccentrically weighted gears 15 and 17 subserve the combined functions of the one-way clutch and torsion spring of earlier structures in a more efficient manner and obviously in a more simplified and rugged mechanism.

The impulses which tend to be delivered by the gears 11 and 13 to the differential gear are aperiodic in character since these gears make complete rotations. However, in the novel combination described this aperiodic or cyclic effect or torque is rectified by the action of the gears 15 and 17. These, as noted, carry the heavier weights and do not make complete revolutions about their axis but oscillate through an angle of 90°. The effect of the gears 15 and 17 as combined and correlated with that of gears 12 and 13 through the intermediary of the differential thus converts the aperiodic sine-like effect of the latter gears into a smooth, unidirectional and immediately constant applied torque which is exactly equal to the load which is to be overcome at any given stage in the operation thus insuring a constant rate of speed for any given load.

This concept of effecting a correlation between an oscillating weight and a rotating weight, as will be appreciated, may be embodied in other and specifically different gear mechanism, as for example in the type of epicyclic gear train shown in Fig. 4.

As there shown, such a unit may comprise the driving shaft 40 to which is attached the gear case 41. The driving shaft is aligned with the driven shaft 42 which is connected to the gear case through a gear train, as shown.

Such gear train includes an arm or spider 43 which is keyed or otherwise locked to the driven shaft 42 and is provided at its outer ends with the bearings 44 on which the gears 45 and 46 are rotatably mounted. The gears 45 and 46 mesh with the ring gear 47 which is loosely mounted on bush 49 of gear 50 which latter is loosely mounted on shaft 42. Gears 45 and 46 also mesh with the gear 48 which is attached to or is integral with the bush or hub 49 of gear 50. The case 41, as shown, supports shaft 51 on which the gear 52 is mounted. This gear is provided with the eccentrically positioned weight 53. The gear 52, as will be observed, meshes with the peripheral teeth of gear 47. The case 41 similarly supports shaft 54 which carries the gear 55 provided with the eccentrically positioned weight 56. As shown and in accordance with the principles hereinbefore expressed, the weight 56 is of greater magnitude than weight 53.

The operation of this modification is essentially similar to that previously described. Driving torque is transmitted through the driving shaft 40, gear case 41, gears 52, 48 and 47 through the arm 43 to the driven shaft 42. During this operation as the shaft 40 and its connected case 41 is driven centrifugal force drives the heavy weight 56 to its outermost position while the gear 52 makes complete revolution. This causes the gear 55 to oscillate through a restricted angle with the outermost point of the weight as mid position. As in the modification shown in Fig. 1, the cyclic or aperiodic impulses delivered by the gear 52 are rectified by the action of the oscillating weight 56 through the interaction of the epicyclic gear train so that a smooth torque is applied to the driven shaft 42 which is exactly equal to the load which is to be overcome.

The above described device, as will be appreciated, is completely effective when the transmission unit is employed in substantial vertical plane as shown. If the unit is to be employed in a horizontal position, i. e., with the axis of rotation in a vertical plane it is desirable to utilize diametrically positioned pairs of gears 55 and 52 in the balanced position shown in Fig. 1.

As will be appreciated, the epicyclic gear train has been simplified. The invention is obviously operable with any type of gear unit which is capable of receiving differential impulses and integrating or resolving this into a resultant unitary impulse.

While illustrative embodiments of the invention have been described it will be understood that these are given didactically to explain the underlying principles of effectively correlating the action of a rotating and an oscillating weight to insure a smooth variable automatic transmission.

I claim:

1. A variable automatic transmission which comprises, a drive shaft, a planetary gear case attached to the drive shaft, a driven shaft, a differential gear including a central spider and two sections connected to the central spider, said gear being interposed between the drive and driven shafts, said gear case being provided with two pairs of gears, one pair being in mesh with one section of the differential and the other said pair being in mesh with the other section of the differential, the gears of one pair having different weights and thereby different moments about their own axis than that of the gears of the other pair and adapted to react on the differential to thereby deliver a smooth torque to the central spider.

2. An automatic variable transmission comprising a drive shaft, a driven shaft, means to transmit rotary motion from the drive to the driven shaft comprising planet gears mounted in connection with the drive shaft, a differential gear and including a central spider and two sections connected with the central spider engaging the planet gears and in positive connection with the driven shaft through its central spider, said planet gears being differently eccentrically weighted, certain of said planet gears being adapted to react on one section of the differential and certain others of said planet gears being adapted to react on the other section of the differential to thereby deliver a smooth torque to the driven shaft.

3. Means for transmitting rotary motion from a drive shaft to a driven shaft comprising a housing in driving connection with one end of the driving shaft, an epicyclic gear train in connection with the driven shaft, a series of differently eccentrically weighted planet gears carried by the housing and in constant mesh with certain gears of the said epicyclic gear train, certain of the weighted planet gears of lesser weight reacting on the epicyclic train through complete revolutions and certain others of greater weight reacting on the said train through oscillating movement to thereby cause a smooth torque to be delivered to the driven shaft.

4. An automatic variable transmission comprising a drive shaft, a driven shaft, a housing in driving connection with the driving shaft, a pair of symetrically positioned differently weighted planet gears carried by the housing, an epicyclic gear train including idling gears in driving connection with the driven shaft, the said planet gears being in mesh with the idling gears of said train the lighter weighted planet gear reacting on the epicyclic gear train through complete revolutions of the heavier weighted planet gear acting on the said train through oscillating movement and adapted to interact thereon to automatically deliver a smooth torque to the driven shaft.

5. A variable automatic transmission which comprises, a drive shaft, a planetary gear case attached to the drive shaft, a differential gear comprising a central spider and two opposite interconnected sections interposed between the drive and the driven shafts, the said central spider being in driving connection with the driven shaft, the said gear case being provided with two pairs of planet gears, one pair being in mesh with one section of the differential and the other pair being in mesh with the other section of the differential and means comprising eccentric weights of different mass secured to the planet gears adapted to react on the differential one set of eccentric weights coacting with one section of the differential and the other set coacting with the opposite section of the differential and to thereby deliver a resultant torque through the central spider of the differential to the driven shaft.

6. A variable automatic transmission comprising a drive shaft, a gear case attached to the drive shaft, a driven shaft, a differential comprising a central spider and two opposite sections intermeshed therewith and having the central spider attached to the driven shaft, the said gear case being provided with two pairs of symmetrically mounted gears, one pair being on each side of and in constant mesh with a respective section of the differential, each pair of gears being provided with an eccentrically mounted weight one set of eccentric weights coacting with one section of the differential and the other set coacting with the opposite section of the differential, the weight on one pair being of greater magnitude than those of the other, the gears having the lesser weights interacting through complete revolutions on the section of the differential in mesh therewith and the gears carrying the greater weights interacting through an oscillating path on the other section of the differential to thereby deliver a smooth torque from the differential to the driven shaft.

7. An automatic variable transmission comprising, a drive shaft, a driven shaft, a housing in driving conection with the drive shaft, an epicyclic gear train in driving connection with the driven shaft, the housing being provided with a pair of gears, the gears of a pair being of different weights and thereby having different moments about their respective axis the gear of lesser moment acting through complete rotative movement and the gear of greater moment acting through oscillating movement, said gears being adapted to react on the epicyclic gear train to deliver a smooth torque to the driven shaft.

8. An automatic variable transmission comprising a drive shaft, a driven shaft, a housing in driving connection with the drive shaft, a gear train in driving connection with the driven shaft, the housing being provided with eccentrically differently weighted planet gears the more heavily weighted planet gear acting through an oscillatory motion and the more lightly weighted gear acting through a rotative motion, said gears being adapted to react on the said gear train to cause the latter to deliver a smooth torque to the driven shaft.

NEILSON WILDE LEWIS.

REFERENCES CITED

The following references are of record in the file of this patent:

UNITED STATES PATENTS

| Number | Name | Date |
| --- | --- | --- |
| 1,685,461 | Nichols | Sept. 25, 1928 |
| 2,033,343 | Larkin | Mar. 10, 1936 |
| 2,290,293 | Porter | July 21, 1942 |

FOREIGN PATENTS

| Number | Country | Date |
| --- | --- | --- |
| 383,991 | Great Britain | Dec. 1, 1932 |
| 502,346 | Great Britain | Mar. 10, 1939 |
| 502,399 | Great Britain | Mar. 10, 1939 |